United States Patent [19]
Ueda

[11] Patent Number: 5,379,245
[45] Date of Patent: Jan. 3, 1995

[54] DECIMAL MULTIPLYING ASSEMBLY AND MULTIPLY MODULE

[75] Inventor: Tsuguo Ueda, Tokyo, Japan

[73] Assignee: NEC Corporation, Japan

[21] Appl. No.: 1,079

[22] Filed: Jan. 6, 1993

[30] Foreign Application Priority Data

Jan. 13, 1992 [JP] Japan .................................... 4-3444

[51] Int. Cl.$^6$ ............................................. G06F 7/52
[52] U.S. Cl. ................................................. 364/756
[58] Field of Search ................ 364/755, 756, 757, 758, 364/763, 754

[56] References Cited

U.S. PATENT DOCUMENTS

| | | | |
|---|---|---|---|
| 4,566,075 | 1/1986 | Guttag | 364/756 |
| 5,060,183 | 10/1991 | Sakashita et al. | 364/757 |
| 5,258,945 | 11/1993 | Lee et al. | 364/756 |

OTHER PUBLICATIONS

Maholick, "Fast BCD Multiplication Logic", IBM Technical Disclosure Bulletin, vol. 20, No. 2, 1977.

Primary Examiner—Roy N. Envall, Jr.
Assistant Examiner—Chuong D. Ngo
Attorney, Agent, or Firm—Laff, Whitesel, Conte & Saret

[57] ABSTRACT

A modular multiplying assembly and a multiply module for use in the multiplying assembly implemented by hard-wired circuits are disclosed. Each module calculates multiplication for operands of a decimal single digit and can receive a carry or carries from adjacent module or modules. Each of the modules is implemented by a memory member or a set of logic gates such as a programmable logic array. In case of module implemented by a set of logic gates, an extremely high-speed calculation is obtained.

15 Claims, 14 Drawing Sheets

DECIMAL MULTIPLYING ASSEMBLY AND MULTIPLY MODULE

FIELD OF THE INVENTION

The present invention relates to a decimal multiplying assembly and a multiply module for use in a multiplying assembly. More particularly, it relates to a decimal multiplying assembly and a multiply module for a high-speed multiplication of decimal multi-digit operands.

BACKGROUND OF THE INVENTION

An example of a conventional decimal multiplying device is shown in FIG. 1, in which each of a decimal N-digit multiplicand and a decimal M-digit multiplier is converted to a binary-coded decimal operands by a decimal-to-binary converter 11 or 12 before multiplication thereof. Multiplication is carried out by a software program for calculating a product of binary-coded decimal operands in a binary mutiplying member 13, the output of which is then converted again to a final decimal product by a binary-to-decimal converter 14.

With another conventional decimal multiplying device, a decimal multiplication table for decimal operands of limited digits in length is stored in a memory of the multiplying device. The table is retrieved as many times as necessary according to the numbers of digits of the multiplier and the multiplicand to be calculated. The resultant data of each retrieval is collected and combined together for obtaining the decimal product by a software program.

Each of the conventional multiplying devices as described above has a disadvantage in which the software program for calculating a product is complicated, hence requiring a large amount of time when the size of the multiplier and the multiplicand are large in length.

SUMMARY OF THE INVENTION

An object of the present invention is to provide a multiply module and a multiply module group for use in a decimal multiplying assembly in which high-speed calculation of a product can be obtained.

Another object of the present invention is to provide a multiplying assembly in which a large amount of processing time is not required due to the modular structure of a multiplying assembly having high-speed multiply modules.

According to the present invention, there is provided a first type of multiply module for a multiplicand and a multiplier each of a binary-coded decimal number of a single decimal digit, for use in a decimal multi-digit multiplying assembly. The multiply module comprises: an input group receiving the multiplicand and multiplier: a hard-wired circuit responsive to the multiplicand and multiplier for generating a binary-coded decimal data representing a product of the multiplicand by the. multiplier; a first output member for outputting a decimal high-order digit of the decimal data; and a second output member for outputting a decimal low-order digit of the decimal data.

The "hard-wired circuit" as used in this text is meant by a wired circuit which is not operated by a software program.

A second type of multiply module according to an embodiment of the present invention can additionally receive a carry from another module. A third type of multiply module according to an embodiment of the present invention can receive two carries. These carries are added to the product of the operands of a single decimal digit. The first and second types of modules can be combined to a first module group operating multiplication of a decimal multi-digit number by a decimal single-digit number. The second and third types of modules can be combined to a second module group for multiplication of a decimal multi-digit number by a decimal single-digit number. The first and second types of module groups are combined to form a multiplying assembly. The multiplying assembly functions multiplication of decimal multi-digit operands in a high-speed.

The multiply module can be implemented by a memory such as a read-only memory or a set of logic gates such as a programmable logic array.

BRIEF DESCRIPTION OF THE DRAWINGS

Other and further objects, features and advantages of the present invention will be more apparent from the following description, referring to the accompanying drawings in which.

DESCRIPTION OF THE PREFERRED EMBODIMENTS

Figure 1:
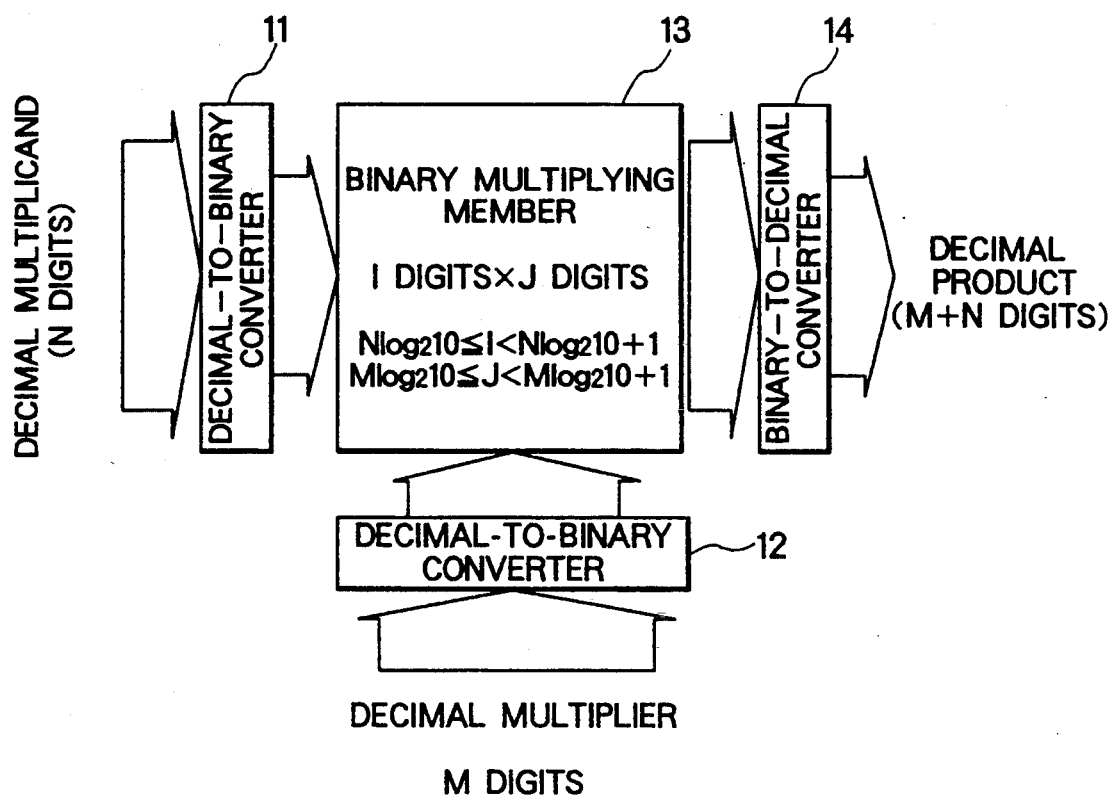
FIG. 1 is a block diagram showing an example of a conventional multiplying device.
Figure 2:
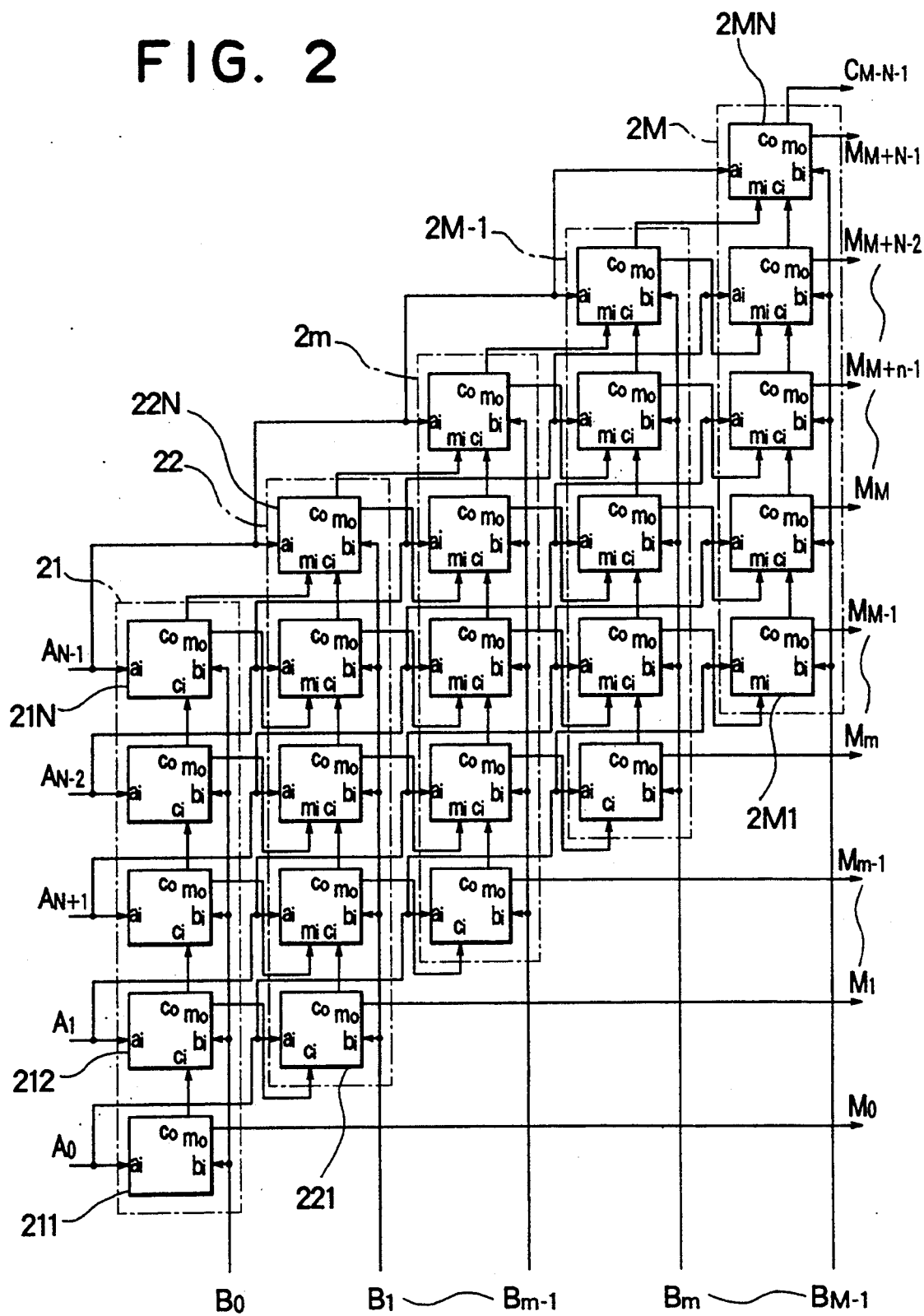
FIG. 2 is a block diagram showing a decimal multiplying assembly according to an embodiment of the present invention.

FIG. 2 shows a decimal multiplying assembly according to an embodiment of the present invention. The multiplying assembly is designed for multiplication of a decimal multiplicand of 1 to N digits in length by a decimal multiplier of 1 to M digits in length. The decimal multiplying assembly comprises $N \times M$ multiply modules each operating multiplication of operands of a single decimal digit, and most of them additionally operate summation of the product and an input carry or carries from another module or other modules. Each column corresponding to each decimal digit $B_0, \ldots, B_{M-1}$ of the multiplier constitutes a module group 21, 22, $\ldots$, 2M, which comprises N multiply modules and performs multiplication of a decimal multiplicand of N digits by a decimal multiplier of a single digit.

Each of the module groups $21, \ldots, 2M$ is supplied with the multiplicand in such a way that each digit $A_o, \ldots, A_{N-1}$ of the multiplicand is respectively supplied to a corresponding module disposed in each of the module groups $21, \ldots, 2M$. The modules are so cascaded to each other in each column that a carry component or a high-order digit of the product or data obtained by a module is transferred through the carry-out $C_o$ of the module to a carry-in $C_i$ of the adjacent module for the adjacent higher order digit of the multiplicand.

Each of the module groups $21, \ldots, 2M$ is supplied with a corresponding order digit of the digits $B_o$ to $B_{M-1}$ of the multiplier. Each of the module groups is shown as being shifted upward one point in the location from the adjacent module group for adjacent lower order digit of the multiplier shown at the left. Hence, module groups $21, \ldots, 2M$ are cascaded to each other in such a way that a product component or low-order digit of the product or data is transferred from a product-out $m_o$ of a module in a column to a carry-in $c_i$ or a product-in $m_i$ of the other module for the adjacent higher order digit of the multiplicand disposed in the adjacent column for the adjacent higher order digit of the multiplier.

The decimal multiplying assembly as described above includes three types of multiply modules referred to as a first, second and third basic module, respectively. The first basic module is disposed for the low-order digit $A_o$ of the multiplicand in the module group 21 of a first type referred to as a first module group corresponding to the low-order digit $B_o$ of the multiplier. The first basic module has two inputs including a multiplicand input $a_i$ and a multiplier input $b_i$ and two outputs including a carry-out output $c_o$ and a product-out output $m_o$.

The second basic modules are provided as the remaining multiply modules in the module group 21 and as the modules corresponding to the low-order digit $A_o$ of the multiplicand in the other module groups $22, \ldots, 2M$ of a second type each referred to as a second module group. The second basic modules each has a carry-in input $c_i$ additionally to the two operand inputs $a_i$, $b_i$ and two outputs $c_o$, $m_o$. The third basic multiply modules are provided as the remaining multiply modules in the multiplying assembly of FIG. 2. The third basic module has two carry-in inputs $c_i$, $m_i$ additionally to the two operand inputs $a_i$, $b_i$ and two outputs $c_o$, $m_o$.

Figure 3:
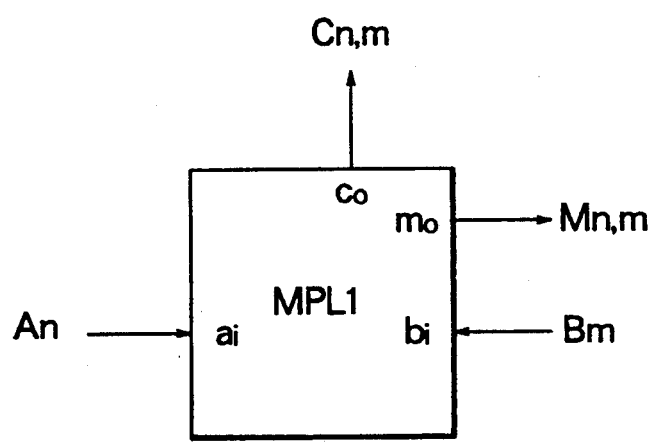
FIG. 3 is a block diagram showing an embodiment of a multiply module according to the present invention, adapted for the first basic module in the multiplying assembly of FIG. 2.

FIG. 3 shows an embodiment of a multiply module according to the present invention applicable to the first basic multiply module in FIG. 2. The multiply module MPL1 of FIG. 3 is constituted by a memory such as a read-only memory comprising two address members $a_i$ and $b_i$ each supplied with a multiplicand $A_n$ and a multiplier $B_m$ each of a binary-coded decimal number of a single decimal digit, respectively, $10 \times 10$ memory elements which can be accessed by the multiplier $A_n$ and the multiplicand $B_m$, and two output members $c_o$ and $m_o$. The data stored in each memory element has a two-digit decimal data, i.e. a 8-bit binary data.

The higher four bits of the data stored in a memory element represent the high-order decimal digit or carry component of the product of the two addresses accessing the memory element, while the lower four bits represent the low-order decimal digit or product component $M_{n,m}$ of the product of the addresses. Hence, the two outputs $C_{n,m}$ and $M_{n,m}$ of the multiply module MPL1, when combined together, have a data representing a binary-coded decimal product of the two inputs or operands $A_n$ and $B_m$.

The data $C_{n,m}$ and $M_{n,m}$ stored in the memory element accessed by the operands $A_n$ and $B_m$ is shown in a decimal representation in Tables 1 and 2, respectively, with all possible combinations of inputs $A_n$ and $B_m$.

(TABLE 1)

DATA TABLE of $C_{n,m}$

| $B_m \downarrow$ | 0 | 1 | 2 | 3 | 4 | 5 | 6 | 7 | 8 | 9 | ← An |
|---|---|---|---|---|---|---|---|---|---|---|---|
| 0 | 0 | 0 | 0 | 0 | 0 | 0 | 0 | 0 | 0 | 0 | |
| 1 | 0 | 0 | 0 | 0 | 0 | 0 | 0 | 0 | 0 | 0 | |
| 2 | 0 | 0 | 0 | 0 | 0 | 1 | 1 | 1 | 1 | 1 | |
| 3 | 0 | 0 | 0 | 0 | 1 | 1 | 1 | 2 | 2 | 2 | |
| 4 | 0 | 0 | 0 | 1 | 1 | 2 | 2 | 2 | 3 | 3 | |
| 5 | 0 | 0 | 1 | 1 | 2 | 2 | 3 | 3 | 4 | 4 | |
| 6 | 0 | 0 | 1 | 1 | 2 | 3 | 3 | 4 | 4 | 5 | |
| 7 | 0 | 0 | 1 | 2 | 2 | 3 | 4 | 4 | 5 | 6 | |
| 8 | 0 | 0 | 1 | 2 | 3 | 4 | 4 | 5 | 6 | 7 | |
| 9 | 0 | 0 | 1 | 2 | 3 | 4 | 5 | 6 | 7 | 8 | |

(TABLE 2)

DATA TABLE of $M_{n,m}$

| $B_m \downarrow$ | 0 | 1 | 2 | 3 | 4 | 5 | 6 | 7 | 8 | 9 | ← An |
|---|---|---|---|---|---|---|---|---|---|---|---|
| 0 | 0 | 0 | 0 | 0 | 0 | 0 | 0 | 0 | 0 | 0 | |
| 1 | 0 | 1 | 2 | 3 | 4 | 5 | 6 | 7 | 8 | 9 | |
| 2 | 0 | 2 | 4 | 6 | 8 | 0 | 2 | 4 | 6 | 8 | |
| 3 | 0 | 3 | 6 | 9 | 2 | 5 | 8 | 1 | 4 | 7 | |
| 4 | 0 | 4 | 8 | 2 | 6 | 0 | 4 | 8 | 2 | 6 | |
| 5 | 0 | 5 | 0 | 5 | 0 | 5 | 0 | 5 | 0 | 5 | |
| 6 | 0 | 6 | 2 | 8 | 4 | 0 | 6 | 2 | 8 | 4 | |
| 7 | 0 | 7 | 4 | 1 | 8 | 5 | 2 | 9 | 6 | 3 | |
| 8 | 0 | 8 | 6 | 4 | 2 | 0 | 8 | 6 | 4 | 2 | |
| 9 | 0 | 9 | 8 | 7 | 6 | 5 | 4 | 3 | 2 | 1 | |

The basic module as described above has no software program within the module, so that a high-speed calculation can be obtained.

A decimal multiply module according to another embodiment of the present invention, applicable to a first basic module in the multiplying assembly of FIG. 2, may be implemented by a set of logic gates, for example, a programmable logic array (PLA) instead of a memory. The PLA module is supplied with binary-coded decimal operand $A_n$ and $B_m$ each of a single decimal digit as its term-for-products, and outputs two binary-coded decimal data $C_{n,m}$ and $M_{n,m}$ as its sum-of-products.

Sum-of-product group $(C_{n,m})_3$, $(C_{n,m})_2$, $(C_{n,m})_1$ and $(C_{n,m})_o$ follows the truth tables listed in Tables 3-1 to 3-4 with all possible combinations of inputs $A_n$ and $B_m$, while sum-of-product group $(M_{n,m})_3$, $(M_{n,m})_2$, $(M_{n,m})_1$ and $(M_{n,m})_o$ follows the truth tables listed in Tables 4-1 to 4-4 with all possible combinations of inputs $A_n$ and $B_m$.

(TABLE 3-1)

$(C_{n,m})_3$

| $B_m \downarrow$ | 0 | 1 | 2 | 3 | 4 | 5 | 6 | 7 | 8 | 9 | ← An |
|---|---|---|---|---|---|---|---|---|---|---|---|
| 0 | 0 | 0 | 0 | 0 | 0 | 0 | 0 | 0 | 0 | 0 | |
| 1 | 0 | 0 | 0 | 0 | 0 | 0 | 0 | 0 | 0 | 0 | |
| 2 | 0 | 0 | 0 | 0 | 0 | 0 | 0 | 0 | 0 | 0 | |
| 3 | 0 | 0 | 0 | 0 | 0 | 0 | 0 | 0 | 0 | 0 | |
| 4 | 0 | 0 | 0 | 0 | 0 | 0 | 0 | 0 | 0 | 0 | |
| 5 | 0 | 0 | 0 | 0 | 0 | 0 | 0 | 0 | 0 | 0 | |
| 6 | 0 | 0 | 0 | 0 | 0 | 0 | 0 | 0 | 0 | 0 | |
| 7 | 0 | 0 | 0 | 0 | 0 | 0 | 0 | 0 | 0 | 0 | |
| 8 | 0 | 0 | 0 | 0 | 0 | 0 | 0 | 0 | 0 | 0 | |

(TABLE 3-1)-continued

| Bm ↓ | 0 | 1 | 2 | 3 | 4 | 5 | 6 | 7 | 8 | 9 | ← An |
|---|---|---|---|---|---|---|---|---|---|---|---|
| | | | | (Cn,m)₃ | | | | | | | |
| 9 | 0 | 0 | 0 | 0 | 0 | 0 | 0 | 0 | 0 | 1 | |

(TABLE 3-2)

| Bm ↓ | 0 | 1 | 2 | 3 | 4 | 5 | 6 | 7 | 8 | 9 | ← An |
|---|---|---|---|---|---|---|---|---|---|---|---|
| | | | | (Cn,m)₂ | | | | | | | |
| 0 | 0 | 0 | 0 | 0 | 0 | 0 | 0 | 0 | 0 | 0 | |
| 1 | 0 | 0 | 0 | 0 | 0 | 0 | 0 | 0 | 0 | 0 | |
| 2 | 0 | 0 | 0 | 0 | 0 | 0 | 0 | 0 | 0 | 0 | |
| 3 | 0 | 0 | 0 | 0 | 0 | 0 | 0 | 0 | 0 | 0 | |
| 4 | 0 | 0 | 0 | 0 | 0 | 0 | 0 | 0 | 0 | 0 | |
| 5 | 0 | 0 | 0 | 0 | 0 | 0 | 0 | 0 | 1 | 1 | |
| 6 | 0 | 0 | 0 | 0 | 0 | 0 | 0 | 1 | 1 | 1 | |
| 7 | 0 | 0 | 0 | 0 | 0 | 1 | 1 | 1 | 1 | 1 | |
| 8 | 0 | 0 | 0 | 0 | 1 | 1 | 1 | 1 | 1 | 1 | |
| 9 | 0 | 0 | 0 | 0 | 1 | 1 | 1 | 1 | 1 | 0 | |

(TABLE 3-3)

| Bm ↓ | 0 | 1 | 2 | 3 | 4 | 5 | 6 | 7 | 8 | 9 | ← An |
|---|---|---|---|---|---|---|---|---|---|---|---|
| | | | | (Cn,m)₁ | | | | | | | |
| 0 | 0 | 0 | 0 | 0 | 0 | 0 | 0 | 0 | 0 | 0 | |
| 1 | 0 | 0 | 0 | 0 | 0 | 0 | 0 | 0 | 0 | 0 | |
| 2 | 0 | 0 | 0 | 0 | 0 | 0 | 0 | 0 | 0 | 0 | |
| 3 | 0 | 0 | 0 | 0 | 0 | 0 | 0 | 1 | 1 | 1 | |
| 4 | 0 | 0 | 0 | 0 | 0 | 1 | 1 | 1 | 1 | 1 | |
| 5 | 0 | 0 | 0 | 0 | 1 | 1 | 1 | 1 | 0 | 0 | |
| 6 | 0 | 0 | 0 | 0 | 1 | 1 | 1 | 0 | 0 | 0 | |
| 7 | 0 | 0 | 0 | 1 | 1 | 1 | 0 | 0 | 0 | 1 | |
| 8 | 0 | 0 | 0 | 1 | 1 | 0 | 0 | 0 | 1 | 1 | |
| 9 | 0 | 0 | 0 | 1 | 0 | 0 | 0 | 1 | 1 | 0 | |

(TABLE 3-4)

| Bm ↓ | 0 | 1 | 2 | 3 | 4 | 5 | 6 | 7 | 8 | 9 | ← An |
|---|---|---|---|---|---|---|---|---|---|---|---|
| | | | | (Cn,m)₀ | | | | | | | |
| 0 | 0 | 0 | 0 | 0 | 0 | 0 | 0 | 0 | 0 | 0 | |
| 1 | 0 | 0 | 0 | 0 | 0 | 0 | 0 | 0 | 0 | 0 | |
| 2 | 0 | 0 | 0 | 0 | 0 | 1 | 1 | 1 | 1 | 1 | |
| 3 | 0 | 0 | 0 | 0 | 1 | 1 | 1 | 0 | 0 | 0 | |
| 4 | 0 | 0 | 0 | 1 | 1 | 0 | 0 | 0 | 1 | 1 | |
| 5 | 0 | 0 | 1 | 1 | 0 | 0 | 1 | 1 | 0 | 0 | |
| 6 | 0 | 0 | 1 | 1 | 0 | 1 | 1 | 0 | 0 | 1 | |
| 7 | 0 | 0 | 1 | 0 | 0 | 1 | 0 | 0 | 1 | 0 | |
| 8 | 0 | 0 | 1 | 0 | 1 | 0 | 0 | 1 | 0 | 1 | |
| 9 | 0 | 0 | 1 | 0 | 1 | 0 | 1 | 0 | 1 | 0 | |

(TABLE 4-1)

| Bm ↓ | 0 | 1 | 2 | 3 | 4 | 5 | 6 | 7 | 8 | 9 | ← An |
|---|---|---|---|---|---|---|---|---|---|---|---|
| | | | | (Mn,m)₃ | | | | | | | |
| 0 | 0 | 0 | 0 | 0 | 0 | 0 | 0 | 0 | 0 | 0 | |
| 1 | 0 | 0 | 0 | 0 | 0 | 0 | 0 | 0 | 1 | 1 | |
| 2 | 0 | 0 | 0 | 0 | 1 | 0 | 0 | 0 | 0 | 1 | |
| 3 | 0 | 0 | 0 | 1 | 0 | 0 | 1 | 0 | 0 | 0 | |
| 4 | 0 | 0 | 1 | 0 | 0 | 0 | 0 | 1 | 0 | 0 | |
| 5 | 0 | 0 | 0 | 0 | 0 | 0 | 0 | 0 | 0 | 0 | |
| 6 | 0 | 0 | 0 | 0 | 1 | 0 | 0 | 0 | 1 | 0 | |
| 7 | 0 | 0 | 0 | 0 | 1 | 0 | 0 | 1 | 0 | 0 | |
| 8 | 0 | 1 | 0 | 0 | 0 | 0 | 1 | 0 | 0 | 0 | |
| 9 | 0 | 1 | 1 | 0 | 0 | 0 | 0 | 0 | 0 | 0 | |

(TABLE 4-2)

| Bm ↓ | 0 | 1 | 2 | 3 | 4 | 5 | 6 | 7 | 8 | 9 | ← An |
|---|---|---|---|---|---|---|---|---|---|---|---|
| | | | | (Mn,m)₂ | | | | | | | |
| 0 | 0 | 0 | 0 | 0 | 0 | 0 | 0 | 0 | 0 | 0 | |
| 1 | 0 | 0 | 0 | 0 | 1 | 1 | 1 | 1 | 0 | 0 | |
| 2 | 0 | 0 | 1 | 1 | 0 | 0 | 0 | 1 | 1 | 0 | |
| 3 | 0 | 0 | 1 | 0 | 0 | 1 | 0 | 0 | 1 | 1 | |
| 4 | 0 | 1 | 0 | 0 | 1 | 0 | 1 | 0 | 0 | 1 | |
| 5 | 0 | 1 | 0 | 1 | 0 | 1 | 0 | 1 | 0 | 1 | |
| 6 | 0 | 1 | 1 | 0 | 1 | 0 | 1 | 0 | 0 | 1 | |
| 7 | 0 | 1 | 1 | 0 | 0 | 1 | 0 | 0 | 1 | 0 | |
| 8 | 0 | 0 | 0 | 0 | 0 | 0 | 0 | 0 | 0 | 0 | |
| 9 | 0 | 0 | 0 | 1 | 1 | 1 | 1 | 0 | 0 | 0 | |

(TABLE 4-3)

| Bm ↓ | 0 | 1 | 2 | 3 | 4 | 5 | 6 | 7 | 8 | 9 | ← An |
|---|---|---|---|---|---|---|---|---|---|---|---|
| | | | | (mn,m)₁ | | | | | | | |
| 0 | 0 | 0 | 0 | 0 | 0 | 0 | 0 | 0 | 0 | 0 | |
| 1 | 0 | 0 | 1 | 1 | 0 | 0 | 1 | 1 | 0 | 0 | |
| 2 | 0 | 1 | 0 | 1 | 0 | 0 | 1 | 0 | 1 | 0 | |
| 3 | 0 | 1 | 1 | 0 | 1 | 0 | 0 | 0 | 0 | 1 | |
| 4 | 0 | 0 | 0 | 1 | 1 | 0 | 0 | 0 | 1 | 1 | |
| 5 | 0 | 0 | 0 | 0 | 0 | 0 | 0 | 0 | 0 | 0 | |
| 6 | 0 | 1 | 1 | 0 | 0 | 0 | 1 | 1 | 0 | 0 | |
| 7 | 0 | 1 | 0 | 0 | 0 | 0 | 1 | 0 | 1 | 1 | |
| 8 | 0 | 0 | 1 | 0 | 1 | 0 | 0 | 1 | 0 | 1 | |
| 9 | 0 | 0 | 0 | 1 | 1 | 0 | 0 | 1 | 1 | 0 | |

(TABLE 4-4)

| Bm ↓ | 0 | 1 | 2 | 3 | 4 | 5 | 6 | 7 | 8 | 9 | ← An |
|---|---|---|---|---|---|---|---|---|---|---|---|
| 0 | 0 | 0 | 0 | 0 | 0 | 0 | 0 | 0 | 0 | 0 | |
| 1 | 0 | 1 | 0 | 1 | 0 | 1 | 0 | 1 | 0 | 1 | |
| 2 | 0 | 0 | 0 | 0 | 0 | 0 | 0 | 0 | 0 | 0 | |
| 3 | 0 | 1 | 0 | 1 | 0 | 1 | 0 | 1 | 0 | 1 | |
| 4 | 0 | 0 | 0 | 0 | 0 | 0 | 0 | 0 | 0 | 0 | |
| 5 | 0 | 1 | 0 | 1 | 0 | 1 | 0 | 1 | 0 | 1 | |
| 6 | 0 | 0 | 0 | 0 | 0 | 0 | 0 | 0 | 0 | 0 | |
| 7 | 0 | 1 | 0 | 1 | 0 | 1 | 0 | 1 | 0 | 1 | |
| 8 | 0 | 0 | 0 | 0 | 0 | 0 | 0 | 0 | 0 | 0 | |
| 9 | 0 | 1 | 0 | 1 | 0 | 1 | 0 | 1 | 0 | 1 | |

The PLA module implementing the first basic multiply module is shown separately in FIGS. 4A to 4H. FIGS. 4A to 4D correspond to Tables 3-1 to 3-4, respectively, while FIGS. 4E to 4H correspond to Tables 4-1 to 4-4, respectively. In each of FIGS. 4A to 4H, both input groups of the term-for-product group $(A_n)_3$, $(A_n)_2$, $(A_n)_1$ and $(A_n)_0$ representing binary-coded decimal multiplicand and the term-for-product $(B_m)_3$, $(B_m)_2$, $(B_m)_1$ and $(B_m)_0$ representing binary-coded decimal multiplier are inputted to the respective portions of the PLA module, through which both of the carry-out bit group $(C_n)_3$, $(C_n)_2$, $(C_n)_1$ and $(C_n)_0$ and product-out bit group $(M_{n,m})_3$, $(M_{n,m})_2$, $(M_{n,m})_1$ and $(M_{n,m})_0$ of the product of the multiplicand $A_n$ by the multiplier $B_m$ are separately outputted.

Now the construction of the PLA module will be described with reference to FIGS. 4A to 4H. Each of multiplicand input bit group $(A_n)_3$, $(A_n)_2$, $(A_1)_1$ and $(A_n)_0$ and multiplier input bit group $(B_m)_3$, $(B_m)_2$, $(B_m)_1$ and $(B_m)_0$ as well as each of the compliments thereof is supplied to a respective input line of the AND-plain 41. Those dots marked at the intersections of the input lines and a particular output line perpendicular to the input lines and connected to a particular AND gate of the AND gate group, such as AND gates 4A0 to 4A19 in FIG. 4A and AND gates 4B0 to 4B19 in FIG. 4B, show that the input lines on which those dots are marked at the particular output lines are inputted to the particular AND gate.

Figure 4A:
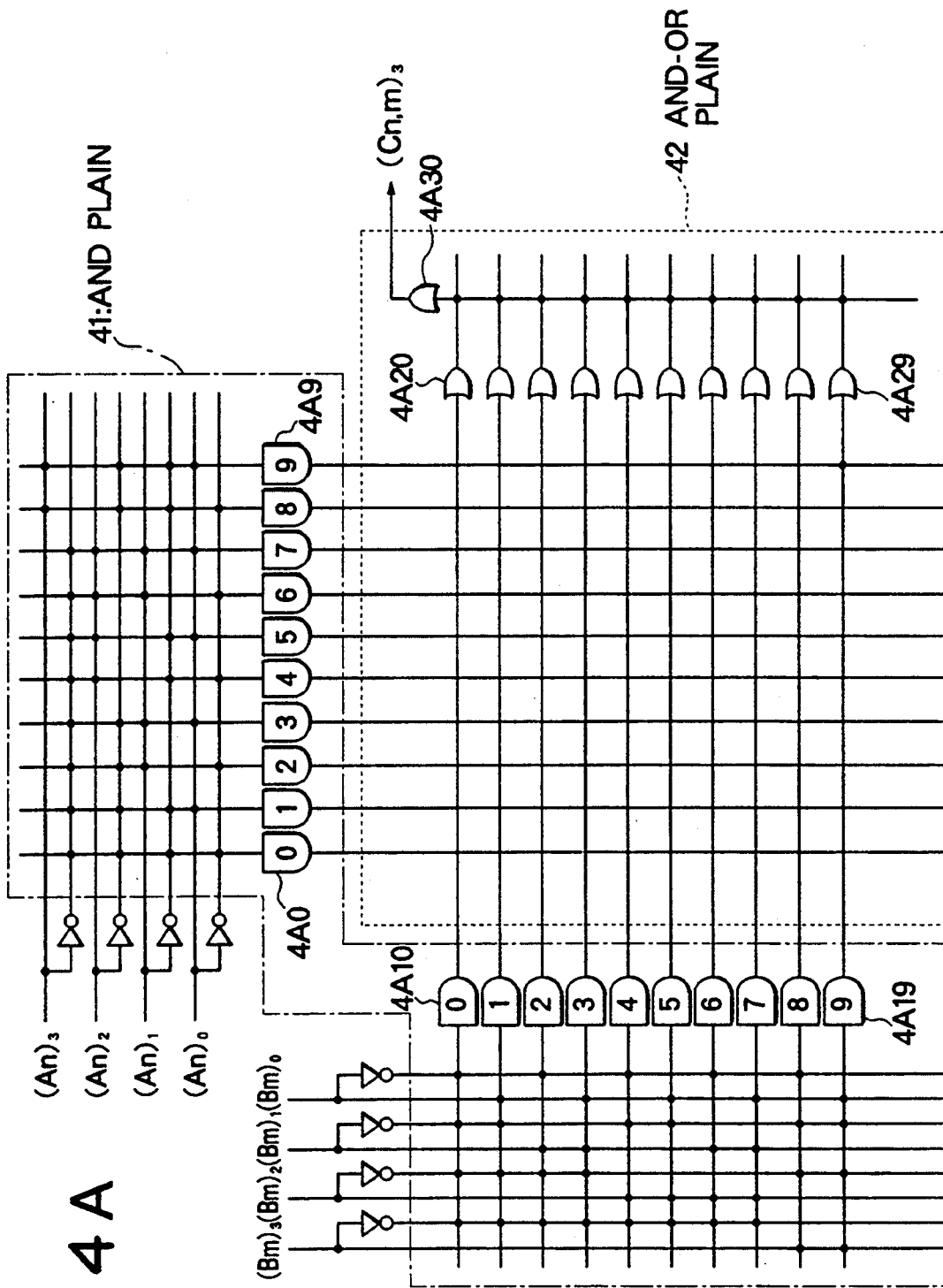
FIGS. 4A to 4H are block diagrams showing another embodiment of a multiply module according to the present invention, adapted for the first basic module in the multiplying assembly of FIG. 2.
Figure 4B:
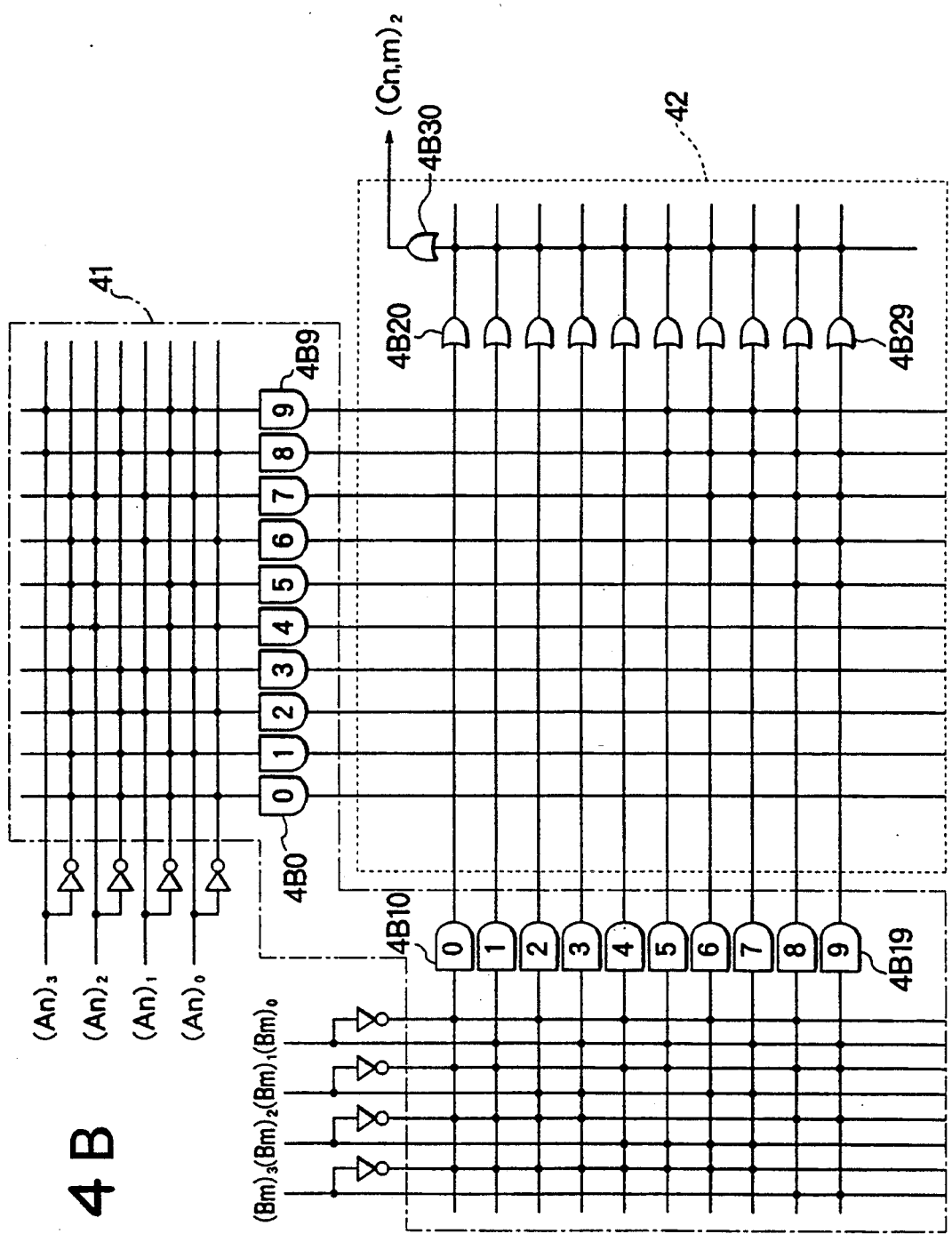
Figure 4C:
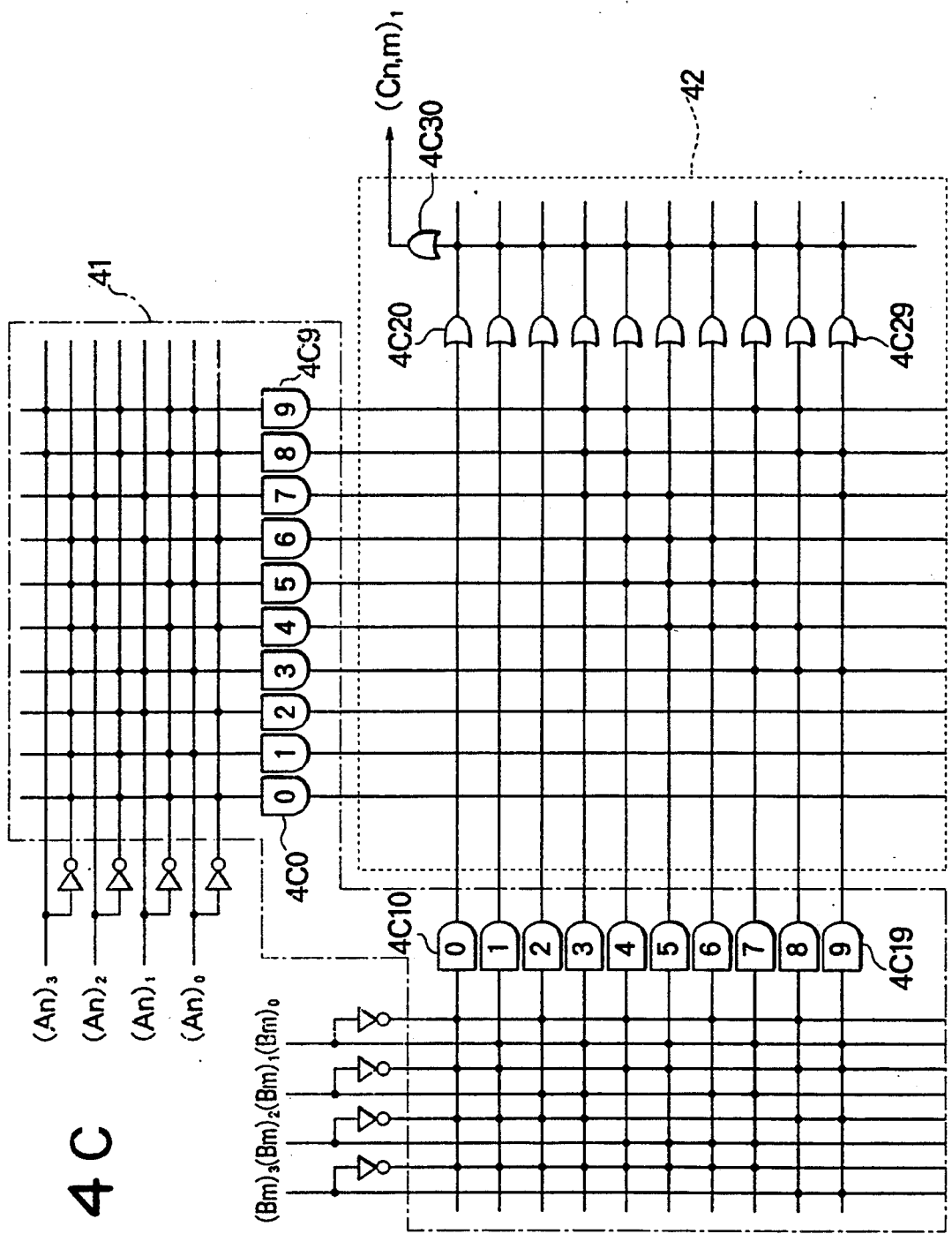
Figure 4D:
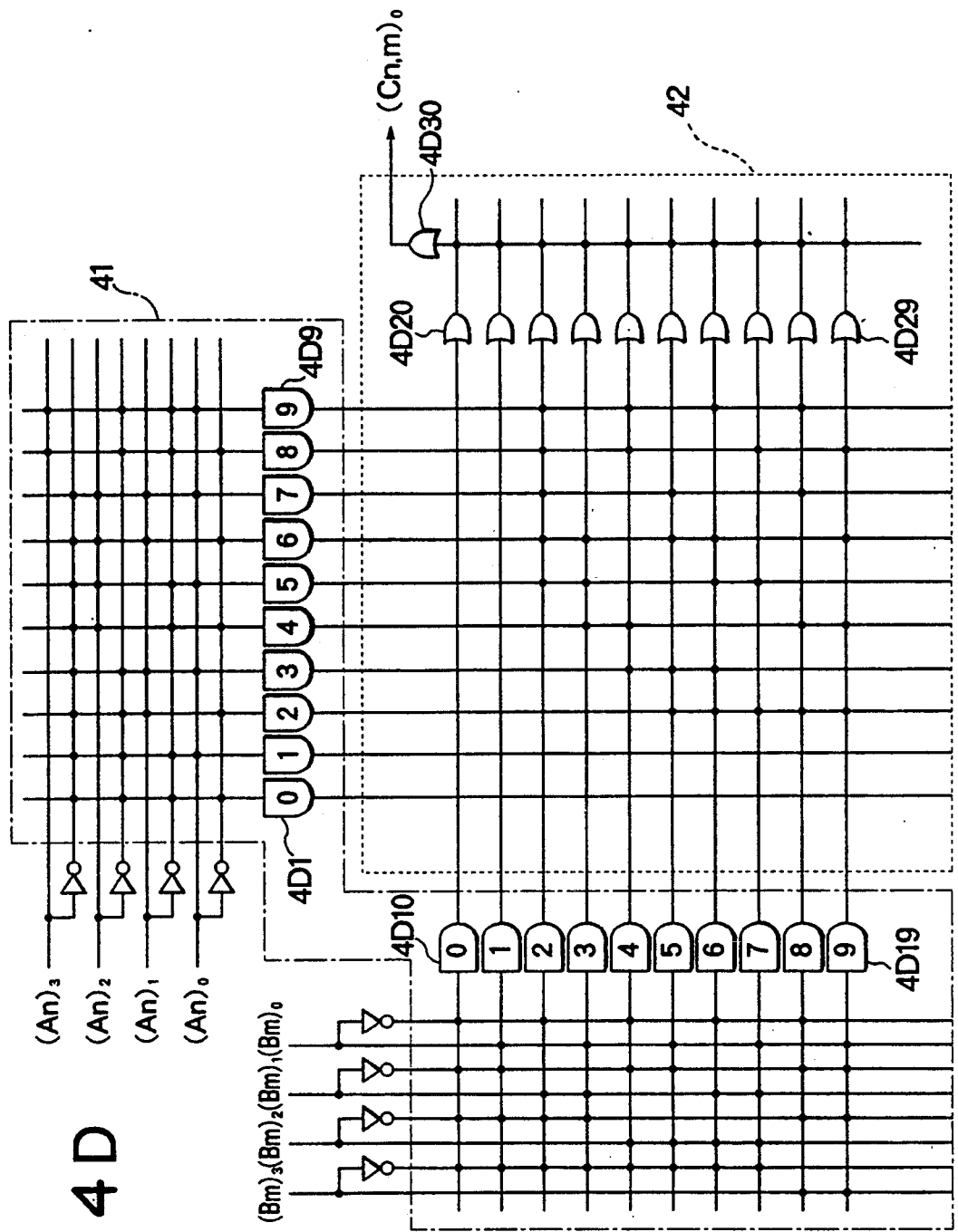
Figure 4E:
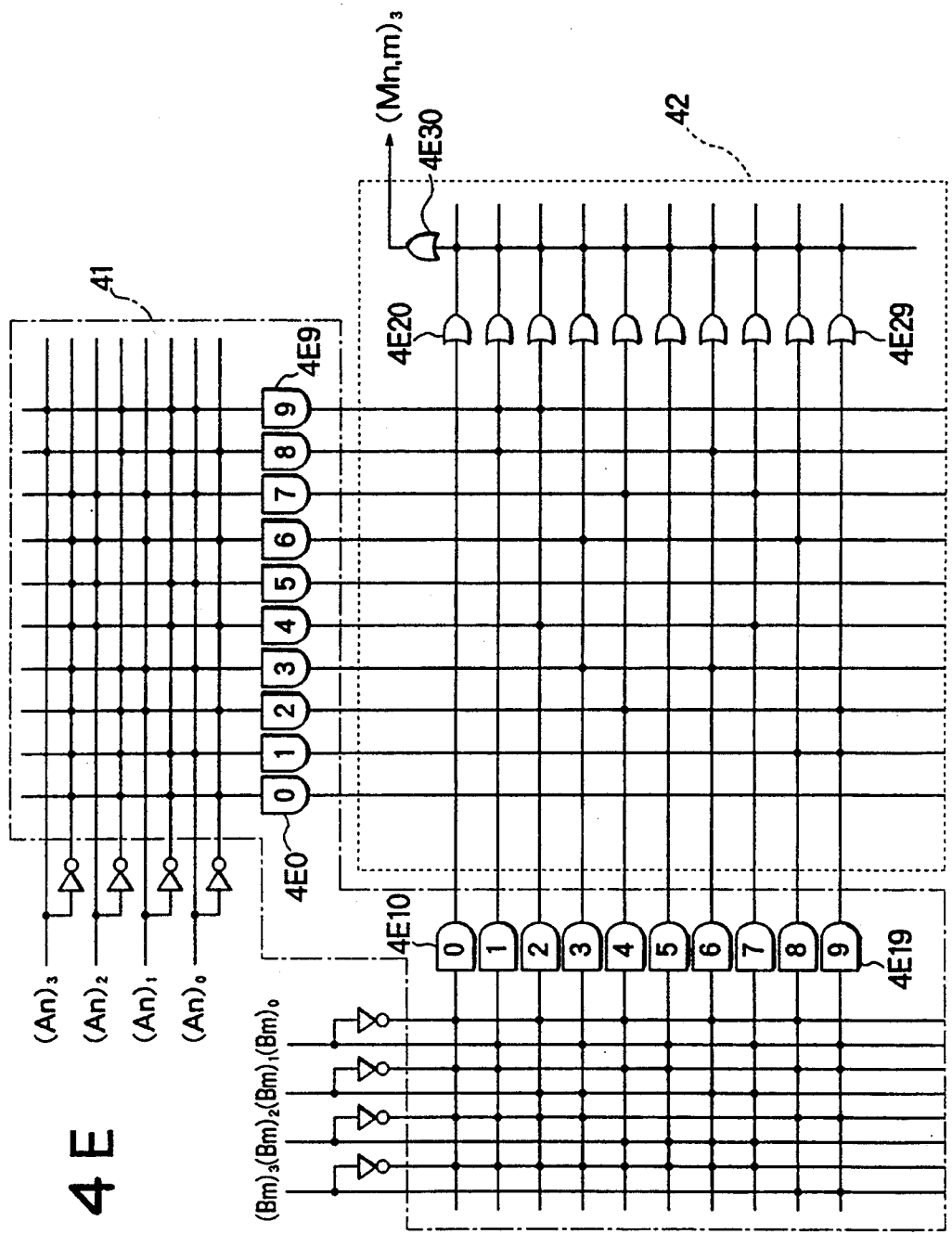
Figure 4F:
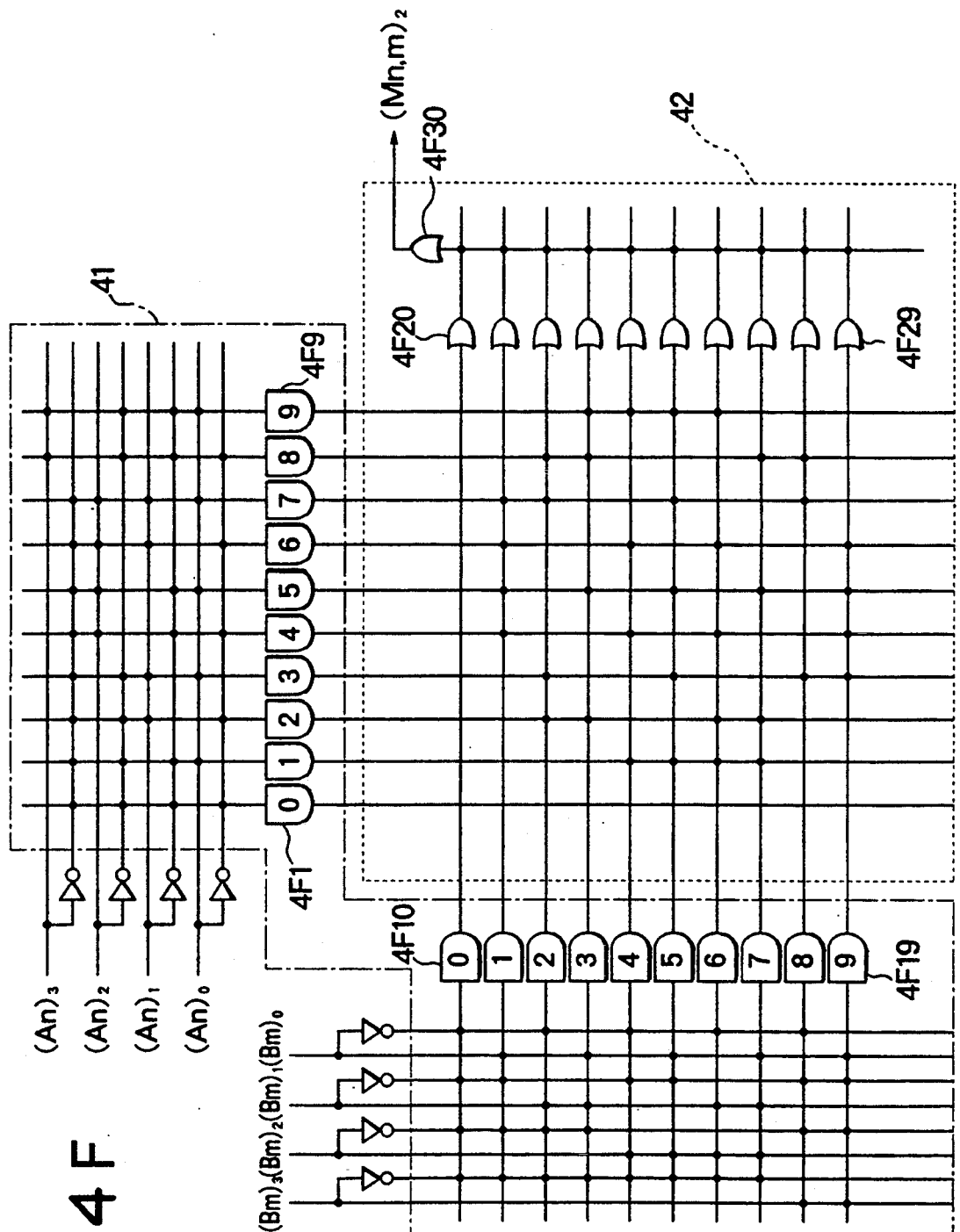
Figure 4G:
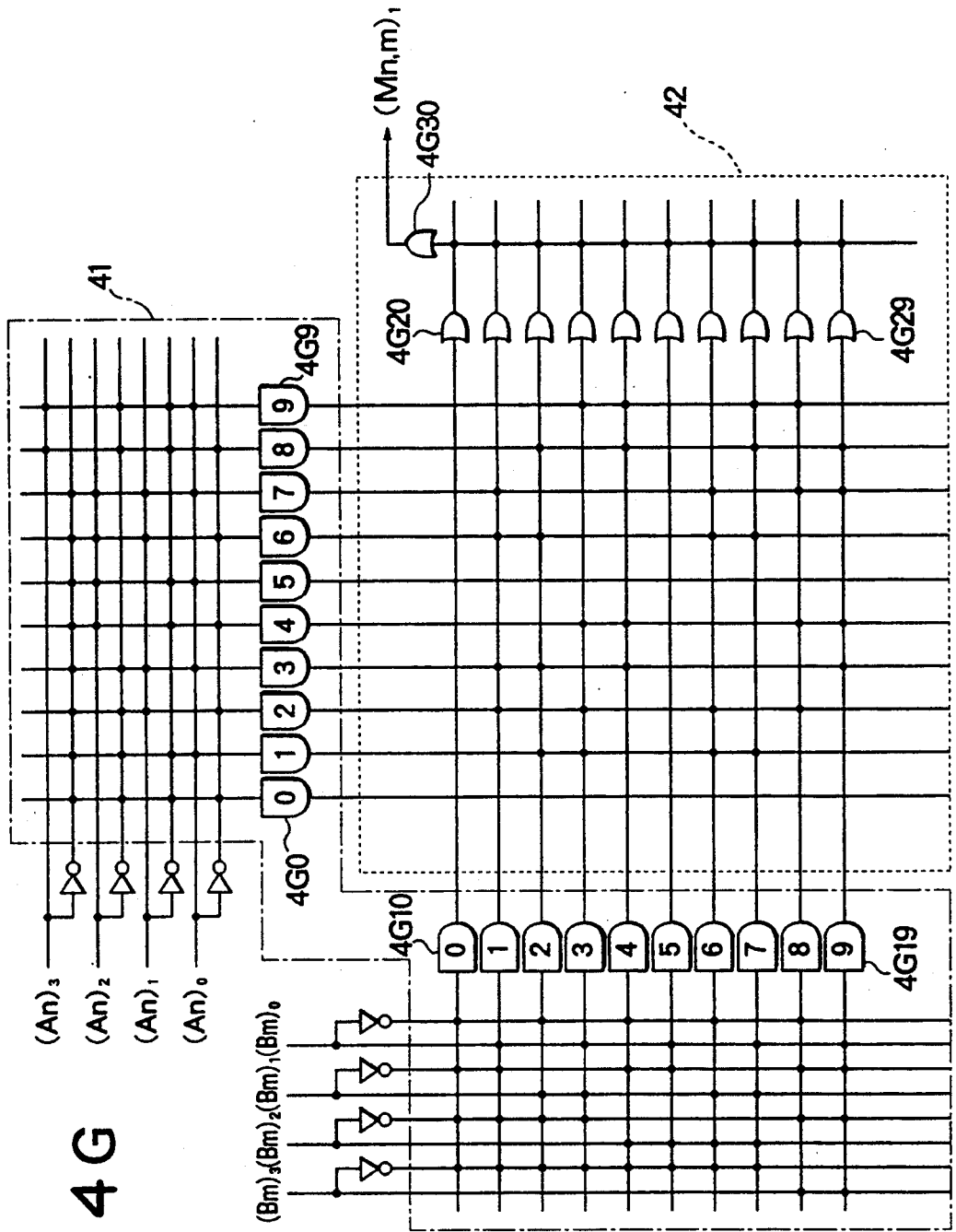
Figure 4H:
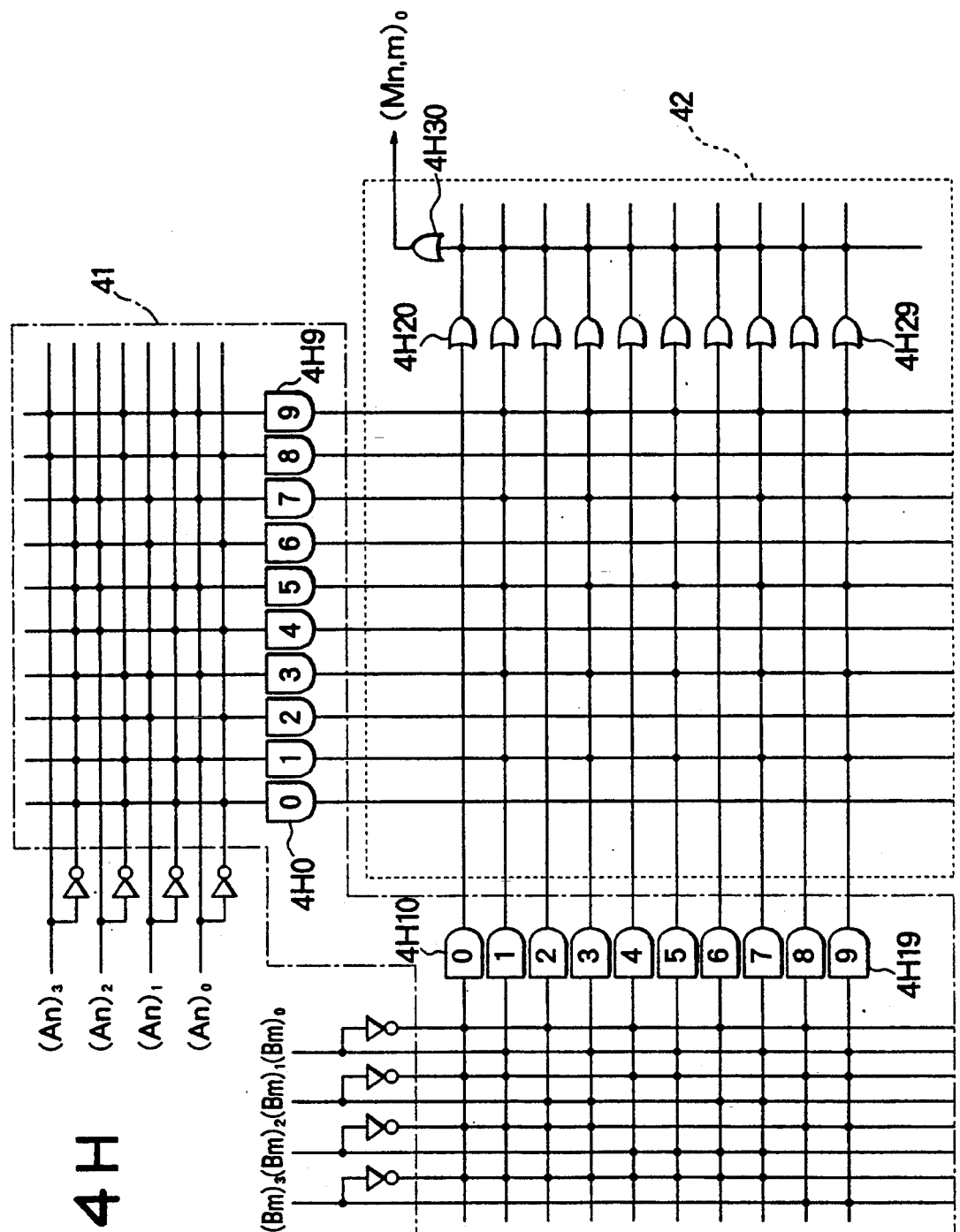

The output of each of the AND gates, such as AND gates 4A0 to 4A19 in FIG. 4A and 4B0 to 4B19 in FIG. 4B, is inputted to an AND-OR plain 42. In FIG. 4A, for example, each of the outputs of AND gates 4A0 to 4A9 are ANDed with each of the outputs of the AND gates 4A10 to 4A19 on the AND-OR plain 42 on condition that a dot is marked at the intersection of the both output lines. These dots on the AND-OR plain 42 are marked in FIGS. 4A to 4H correspondingly to the 1s of the data marked in Tables 3-1 to 3-4 and 4-1 to 4-4. The ANDs thus obtained are supplied to the respective OR gates, for example, 4A20 to 4A29, the output of which are ORed in an OR gate, for example, 4A30 in FIG. 4A and then outputted as a bit of a carry component $C_{n,m}$ or a product component $M_{n,m}$.

With the embodiment of FIGS. 4A to 4H, time interval between the occurrence of the input and the occurrence of the output is very small due to the logic gate construction, so that a further high-speed calculation is obtained as compared to the first embodiment implemented by a memory member.

Figure 5:
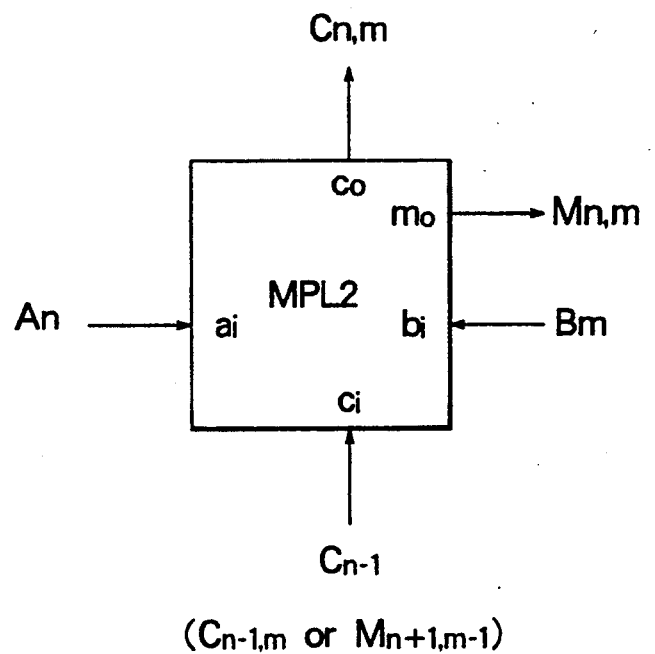
FIG. 5 is a block diagram showing still another embodiment of a multiply module according to the present invention, adapted for the second basic module in the mutiplying assembly of FIG. 2.

FIG. 5 shows still another embodiment of a decimal multiply module according to the present invention, applicable to the second basic multiply module in FIG. 2. The multiply module MPL2 shown in FIG. 5 functions multiplication of operands of a single decimal digit and can receive an input carry from another multiply module such as the first basic multiply module or another second basic multiply module.

The multiply module MPL2 is constituted by a memory such as a read-only memory comprising an address group including three address members $a_i$, $b_i$ and $c_i$ each supplied with a multiplicand $A_n$, a multiplier $B_m$ and a carry input $C_{n-1}$, respectively. Each of the inputs $A_n$, $B_m$ and $C_{n-1}$ has a binary-coded decimal data of a single decimal digit. When the multiply module MPL2 is used in the multiplying assembly of FIG. 2, the carry-in input $c_i$ is supplied with either a carry $C_{n-1,m}$ from a carry-out $c_o$ of an adjacent multiply module for a lower order digit in the same module group or a carry $M_{n+1,m-1}$ from a product-out $m_o$ of an adjacent multiply module for a lower order digit of the multiplicand disposed in a adjacent module group for a lower order digit of the multiplier.

Each of the memory elements accessed by the three inputs $A_n$, $B_m$ and, for example, $C_{n-1,m}$ has a 8-bit data, and the data S1 is expressed in a decimal representation by the following equation:

$$S1 = A_n \times B_m + C_{n-1,m}$$

The higher four bits of the data S1 is outputted from the carry-out $C_{n,m}$ of the module outputs, while the lower four bits of the data S1 is outputted from the product-out $M_{n,m}$ of the module outputs.

The second basic multiply module can be also implemented by a set of logic gates such as a PLA module instead of a memory. The PLA module is supplied with binary-coded decimal operands $A_n$, $B_m$ and a carry $C_{n-1,m}$ or $M_{n+1,m-1}$ as its term-for-products and outputts binary-coded decimal data S1' including a carry component $C_{n,m}$ and a product component $M_{n,m}$ as its sum-of-products. The PLA module is constructed in such a way that, when the PLA module is supplied with data $A_n$, $B_m$ and, for example, $C_{n-1,m}$, the output data S1' is expressed in a decimal representation as follows:

$$S1' = A_n \times B_m C_{n-1,m}$$

Figure 6:
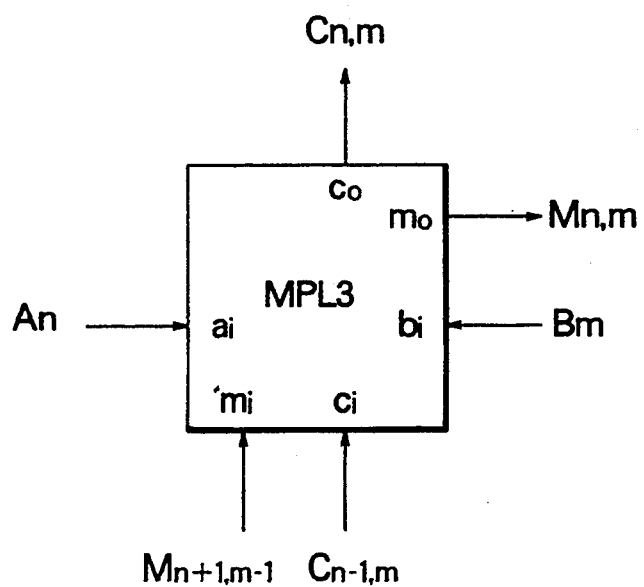
FIG. 6 is a block diagram showing still another embodiment of a multiply module according to the present invention, adapted for the third basic module in the multiplying assembly of FIG. 2.

FIG. 6 shows still another embodiment of a decimal multiply module according to the present invention, applicable to the third basic multiply module in FIG. 2. The multiply module MPL3 shown in FIG. 6 functions multiplication of binary-coded decimal operands and can receive two carries from other modules. This module MPL3 is constituted by a memory such as a read-only memory and has four address members each supplied with a multiplicand $A_n$, a multiplier $B_m$, a first input carry $C_{n-1,m}$ and a second input carry $M_{n+1,-1}$, respectively.

When the multiply module MPL3 is used in the multiplying assembly of FIG. 2, the first input carry $C_{n-1,m}$ is supplied from a carry-out $c_o$ of an adjacent module for a lower order digit in the same module group, while the second input carry $M_{n+1,m-1}$ is supplied from a product-out $m_o$ of an adjacent module for a lower-order digit $A_o$ of the multiplicand disposed in a adjacent module group for a lower order digit of the multiplier.

Each of the memory elements accessed by the four inputs $A_n$, $B_m$, $C_{n-1,m}$ and $M_{n+1,m-1}$ has a two-digit decimal data S2 including a high-order digit $C_{n,m}$ and a low-order digit $M_{n,m}$ the data S2 being expressed by the following equation:

$$S2 = A_n \times B_m + C_{n-1,m} + M_{n+1,m-1}.$$

The third basic multiply module may be also implemented by a PLA instead of a memory. The PLA is supplied with inputs $A_n$, $B_m$, $C_{n-1,m}$ and $M_{n+1,m-1}$ as its term-for-products and outputts binary-coded decimal data S2' including a high-order digit $C_{n,m}$ and a low-order digit $M_{n,m}$ as its sum-of-products. The PLA module is constructed in such a way that, when the PLA is supplied with data $A_n$, $B_m$, $C_{n-1,m}$ and $M_{n+1,m-1}$ as its term-for-products, the output sum-of-products S2' is expressed in a decimal representation as follows:

$$S2' = A_n \times B_m + C_{n-1.m} + M_{n+1.m-1}$$

Figure 7:
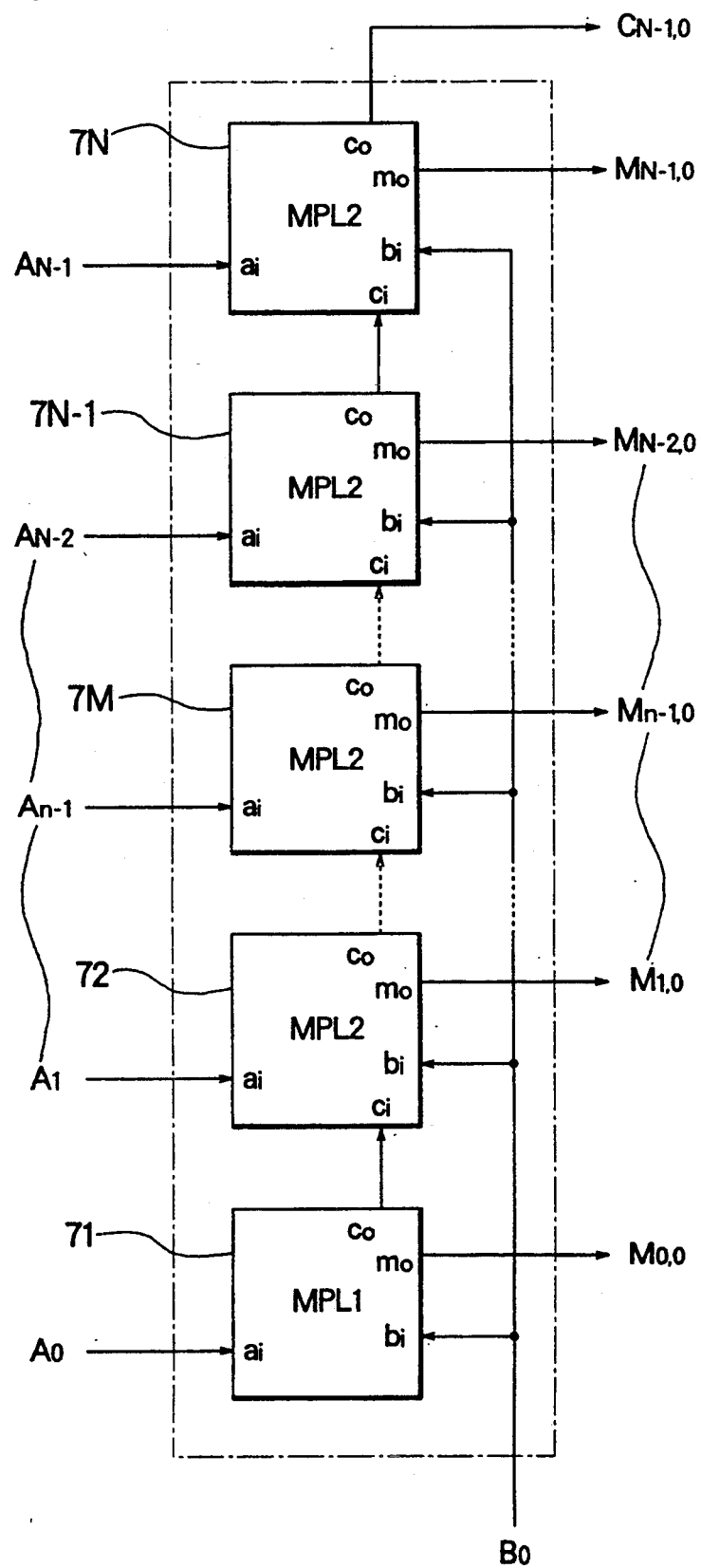
FIG. 7 is a block diagram showing an embodiment of a multiply module group according to the present invention, adapted for the first, module group in the multiplying assembly of FIG. 2.

FIG. 7 shows an embodiment of a multiply module group according to the present invention, applicable to the first module group 21 of the multiplying assembly of FIG. 2. The module group of FIG. 7 comprises a multiply module MPL1 of FIG. 3 as its low-order module 71 for the low-order digit $A_o$ of the multiplicand and a plurality of multiply modules MPL2 of FIG. 5 as its remaining modules 72 to 7M for the other digits of the multiplicand. Each of the modules 71 to 7N is supplied with a corresponding digit AO, ... ,AN−1 of a multiplicand having decimal N digits (N >= 1) and a common multiplier $B_o$ having a single decimal digit.

A carry component outputted from the carry-out $c_o$ of each of the multiply modules 71 to 7N−1 is supplied to the carry-in $c_i$ of each of the adjacent modules 72 to 7M of the higher order position, respectively, so that the output $M_{o,o}$ to $M_{N-1,0}$ of the decimal multiply module group of FIG. 7 is outputted through the product-out $m_o$ of each of the multiply modules 71 to 7N. The carry component $C_{N-1,0}$ of the multiply module 7N is the high-order digit of the decimal output of the module group, which is supplied to another module for the high-order digit of the multiplicand in the adjacent higher order module group in FIG. 2.

Figure 8:
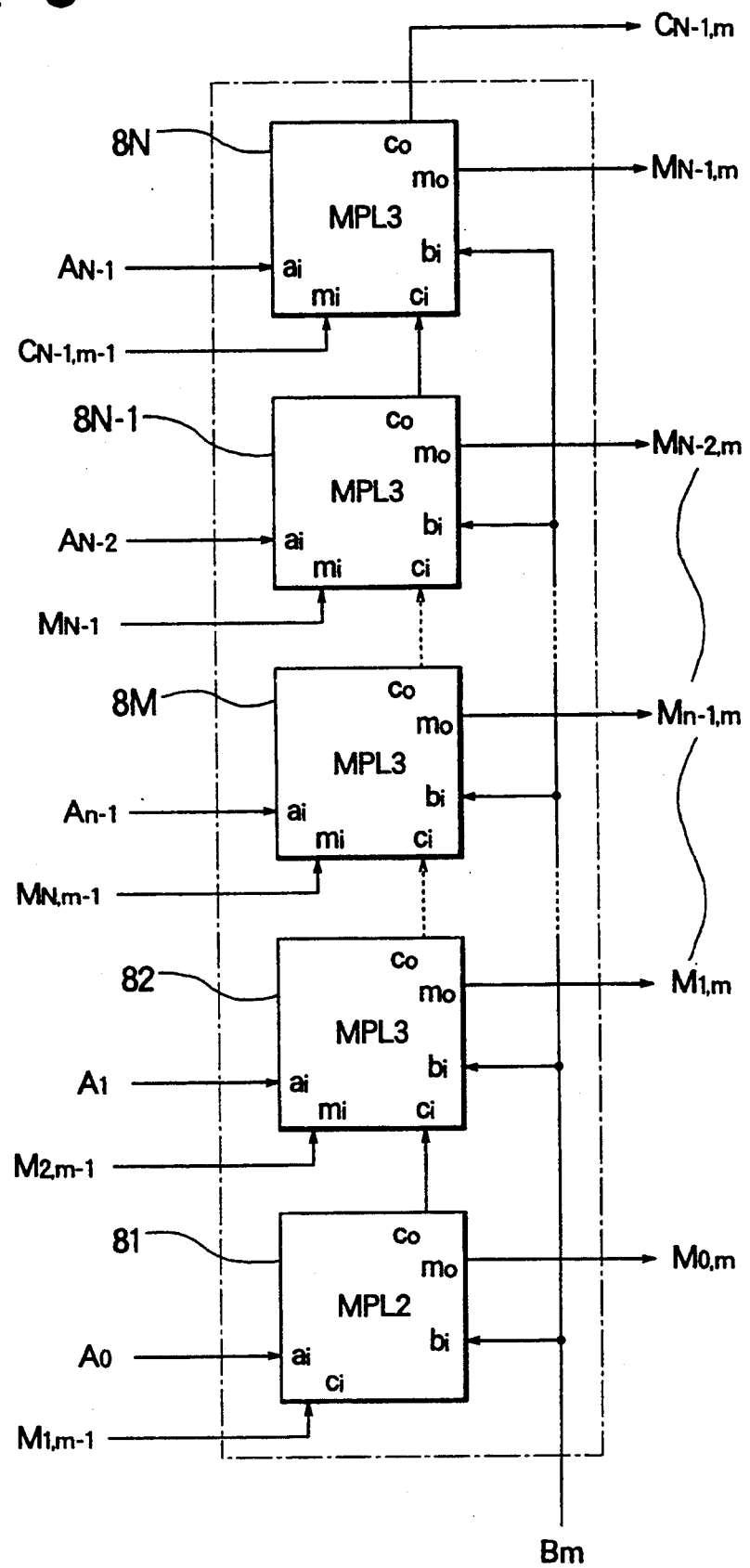
FIG. 8 is a block diagram showing another embodiment of a multiply module group according to the present invention, adapted for the second module group in the multiplying assembly of FIG. 2.

FIG. 8 shows another embodiment of a multiply module group according to the present invention, applicable to the second module groups 21, . . . ,2M in the multiplying assembly of FIG. 2. The module group of FIG. 8 comprises a multiply module MPL2 of FIG. 5 as its low-order module 81 for low-order digit $A_o$ of the multiplicand and a plurality of multiply modules MPL3 of FIG. 6 as its remaining modules 82 to 8N. Each module 81 to 8N is supplied with a corresponding digit $A_o, \ldots, A_{n-1}$ of a multiplicand having decimal N digits ($N > = 1$) and a common multiplier $B_m$ having a single decimal digit.

A carry component outputted from the carry-out $c_o$ of each of the multiply modules 81 to 8N−1 is supplied to the carry-in $c_i$ of the adjacent module 82 to 8N of the higher order position. The carry component $C_{N-1,m}$ from the carry-out $c_o$ of the multiply module 8N is supplied to the module for the high-order digit $A_{n-1}$ of the multiplicand disposed in the adjacent higher order module group. Each of the product components from product-out $m_o$ is supplied to the adjacent module in the adjacent module group or outputted as a digit of a final product.

Turning now to FIG. 2, the operation of the multiplying assembly will be described.

When a multiplicand and a multiplier is inputted to the multiplying assembly, the multiply module 211 of the low-order position first operates with the low-order digits $A_o$ and $B_o$ of the inputted operands. The module 211 outputs from its product-out $m_o$ the low-order digit $M_o$ of the final decimal product and from its carry-out $c_o$ a carry component to the adjacent module 212 of the next low-order position in the same module group 21.

Next, the module 212 operates with the three data $A_1$, $B_o$ and the input carry supplied from the module 211, and outputts a carry and a product components. Then, the module 221 disposed adjacent to the module 212 in the next low-order module group 22 operates, and outputts a next low-order digit $M_1$ of the final output product as well as a carry component. The calculation is operated likewise in sequence in the multiplying assembly without any software program or a controller, hence a high-speed calculation can be obtained. Additionally, the time required for calculation depends only on the numbers of the digits of the two operands to be calculated, so that the calculation time does not depends on the result to be obtained.

At least one of the first and the second basic modules in the multiplying assembly may be substituted by a third basic module. In this case, the carry-in input not necessary for the operation is fixed at zero. Employing this configuration provides ease of fabrication.

When the multiplying assembly of FIG. 2 is implemented by multiply modules of a set of logic gates, such as PLA modules, a further high-speed operation can be obtained, since the propagation delay of the logic gates is smaller than the access time of the memory.

Since above embodiments are described only for examples, the present invention is not limited to such embodiments and it will be obvious for those skilled in the art that various modifications or alterations can be easily made based on the above embodiments under the scope of the present invention.

What is claimed is:

1. A multiplication module for multiplying a multiplicand and a multiplier each being a binary-coded decimal number of a single decimal digit, for use in a decimal multi-digit multiplying assembly, said multiplication module comprising: an input group for receiving a signal group including said multiplicand, said multiplier and a carry of a binary-coded decimal single digit; multiplication table means having decimal data representing a sum of a product resulting from a multiplication of said multiplicand by said multiplier and said carry for each possible digit of said multiplicand, multiplier and carry; retrieving means responsive to said signal group for retrieving said decimal data from said multiplication table means, first outputting means for outputting a high-order decimal digit of said decimal data retrieved by said retrieving means; and second output means for outputting a low-order decimal digit of said decimal data retrieved by said retrieving means.

2. A multiply module as defined in claim 1 wherein said multiplication table means is a memory device.

3. A multiply module as defined in claim 1 wherein said multiplication table means is means comprising a programmable logic array.

4. A multiplication module for multiplying a multiplicand and a multiplier each being a binary-coded decimal number of a single decimal digit, for use in a decimal multi-digit multiplying assembly, said multiplication module comprising: an input group for receiving a signal group including said multiplicand, said multiplier, first and second carries of a binary-coded decimal single digit; multiplication table means having decimal data representing a sum of a product resulting from a multiplication of said multiplicand by said multiplier and said first carry and said second carry for each of possible digits of said multiplier, multiplicand and first and second carries; retrieving means responsive to said signal group for retrieving said decimal data from said multiplication table means; a first output means for outputting a high-order decimal digit of said decimal data retrieved by said retrieving means; and a second output means for outputting a low-order decimal digit of said decimal data retrieved by said retrieving means.

5. A multiplication module as defined in claim 4 wherein said multiplication table means is a memory device.

6. A multiplication module as defined in claim 4 wherein said multiplication table means is means comprising a programmable logic array.

7. A multiplication module group for multiplying a first operand of a binary-coded decimal number of a plurality of decimal digits and a second operand of a binary-coded decimal number of a single decimal digit, for use in a decimal multi-digit multiplying assembly, said multiplication module group comprising:

a first multiplication module including a first multiplication table means having first decimal data representing a product of a low-order digit of said first operand by said second operand for each possible digit thereof, first retrieving means for retrieving said first decimal data from said first multiplication table means, first output means for separately outputting high-order and low-order decimal digits of said first decimal data retrieved by said first retrieving means as first carry and first product components, respectively; and a plurality of second multiplication modules each being disposed correspondingly to a respective digit except said low-order digit of said first operand and each including second multiplication table means having second decimal data representing a sum of a product of said respective digit by said second operand and an input carry, second retrieving means for retrieving said second decimal data from said second multiplication table means, second output means for separately outputting high-order and low-order decimal digits of said second decimal data retrieved by said second retrieving means as second carry and second product components, respectively:

said basic modules being cascaded so that each of said second basic modules is supplied with said carry component as an input carry from another module of said first and second basic modules corresponding to an adjacent lower order digit of said first operand.

8. A multiply module group as defined in claim 7 wherein each of said first and second multiplication table means is a memory device.

9. A multiply module group as defined in claim 7 wherein said each of said first and second multiplication table means is a programmable logic array.

10. A multiplication module group for multiplying a first operand of a binary-coded decimal number of a plurality of decimal digits and a second operand of a binary-coded decimal number of a single decimal digit, for use in a decimal multi-digit multiplying assembly, said multiplication module group comprising:

a first multiplication module including a first multiplication table means having first decimal data representing a sum of a product of a low-order decimal digit by said second operand and a first input carry for each of possible digits thereof, first retrieving means for retrieving said first decimal data from said first multiplication table means, and first output means for separately outputting high-order and low-order decimal digits of said first decimal data which are retrieved by said first retrieving means as first carry and first product components, respectively; and a plurality of second multiplication modules each being disposed correspondingly to a respective digit except said low-order digit of said first operand and each including second multiplication table means having second decimal data representing a sum of a product of said respective digit by said second operand and said second input carry and said third input carry for each possible digit thereof, second retrieving means for retrieving said second decimal data from said second multiplication table means, and second output means for separately outputting high-order and low-order decimal digits of said second decimal data retrieved by said second retrieving means as second carry and second product components, respectively:

said multiply modules being cascaded so that each of said second multiplication modules is supplied with said carry component as an input carry from another module of said first and second multiplication modules corresponding to an adjacent lower order digit of said first operand.

11. A multiply module group as defined in claim 10 wherein each of said first and second multiplication table means is a memory device.

12. A multiply module group as defined in claim 10 wherein each of said first and second multiplication table means is a programmable logic array.

13. A multiplying assembly for multiplying first and second operands, each of which is a binary-coded decimal multi-digit number comprising:

(a) a first multiplication module group disposed for a low-order digit $B_o$ of said second operand comprising:

a first multiplication module including first multiplication table means having first decimal data representing a product of a low-order digit $A_o$ of said first operand by a low-order digit $B_o$ of said second operand for each possible digit thereof, first retrieving means for retrieving said first decimal data from said first multiplication table means, and first output means for separately outputting high-order and low-order decimal digits of said first decimal data retrieved by said first retrieving means as first carry and first product components, respectively; and a plurality of second multiplication modules each being disposed correspondingly to a respective digit $A_n$ except for said low-order digit $A_o$ of said first operand and each of said modules including second multiplication table means having second decimal data representing a sum of a product of said respective digit $A_n$ of said first operand by said low-order digit $B_o$ of said second operand and a first input carry, second retrieving means for retrieving said second decimal data from said second multiplication table means and second output means for outputting separately high-order and low-order decimal digits of said second decimal data retrieved by said second retrieving means as second carry and second product components, respectively;

(b) a plurality of second multiplication module groups each being disposed for a respective digit $B_m$ except for said low-order digit $B_o$ of said second operand comprising;

a third multiplication module including third multiplication table means having third decimal data representing a sum of a product of said low-order digit $A_o$ of said first operand by said respective digit $B_m$ of said second operand and said second input carry for each possible digit thereof, third retrieving means for retrieving said third decimal data from said third multiplication table means, and third output means for separately outputting high-order and low-order decimal digits of said third decimal data retrieved by said third retrieving means as third carry and third product components, respectively; and a plurality of fourth multiplication modules each being disposed for another respective digit $A_m$ except said low-order digit $A_o$ of said first operand and each including fourth multiplication table means having fourth decimal data representing a sum of a product of said another respective digit $A_n$ of said first operand by said respective digit $B_m$ of said second operand and a third input carry and said fourth input carry for each possible digit thereof, fourth retrieving means for retrieving said fourth decimal data from said fourth multiplication table means, and fourth output means for separately outputting high-order and low-order decimal digits said fourth decimal data retrieved by said fourth retrieving means as fourth carry and fourth product components, respectively:

(c) said multiply modules being cascaded in each of said multiplication module groups so that said carry component is transferred between two modules corresponding to adjacent order digits of the first operand disposed in the same module group; and said multiplication module groups being cascaded to each other so that each of said product components except said product component from said first or third module and said carry component from said module of a high-order digit $A_{n-1}$ are transferred between two of said module groups corresponding to adjacent order digits of said second operands for generating a final output product of said first operand by said second operand.

14. A multiplying assembly as defined in claim 13 wherein each of said first through fourth multiplication table means is a memory device.

15. A multiplying assembly as defined in claim 13 wherein each of said first through fourth multiplication table means is a programmable logic array.

* * * * *